G. S. KNAPP.
Hose-Clamps or Patches.
No. 161,045. Patented March 23, 1875.
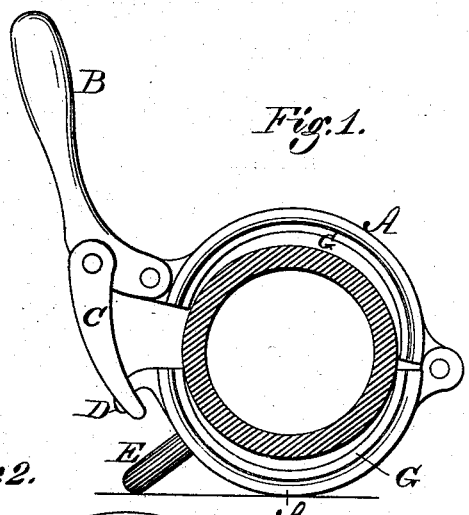
Fig. 1.
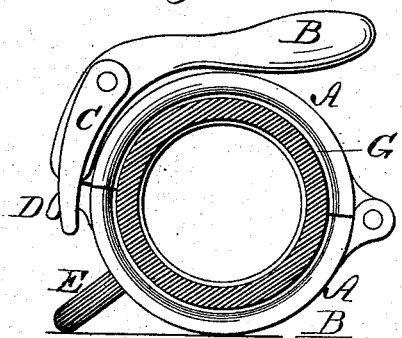
Fig. 2.
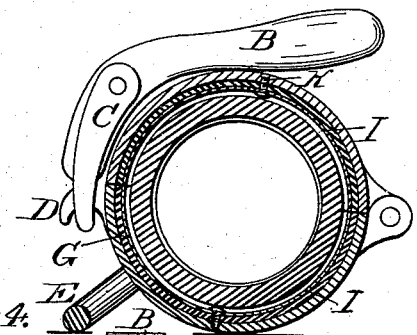
Fig. 3.
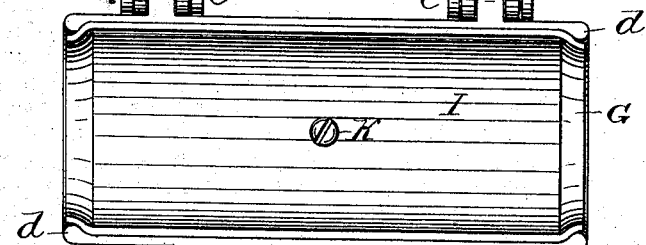
Fig. 4.
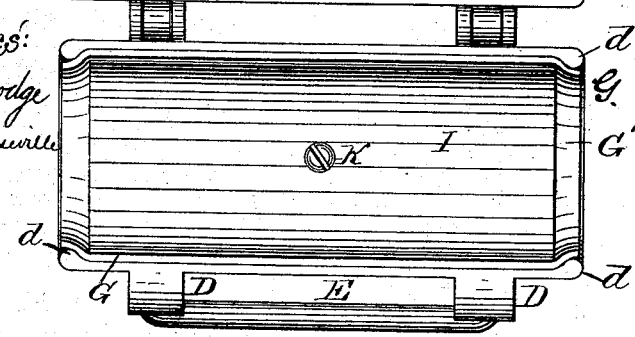
Witnesses:
Will N. Dodge
William Rouwille
Inventor:
G. S. Knapp
By his attys
Dodge & Son

UNITED STATES PATENT OFFICE.

GEORGE S. KNAPP, OF CHICAGO, ILLINOIS.

IMPROVEMENT IN HOSE CLAMPS OR PATCHES.

Specification forming part of Letters Patent No. 161,045, dated March 23, 1875; application filed February 13, 1875.

*To all whom it may concern:*

Be it known that I, GEORGE S. KNAPP, of Chicago, in the county of Cook and State of Illinois, have invented certain Improvements in Hose Clamps or Patches, of which the following is a specification:

My invention consists in a hose clamp or patch provided with peculiar fastening devices, with a handle, by which to carry it and hold it while being fastened, and with a packing applied in a peculiar manner.

Figure 1 represents an end view of my clamp as applied to the hose before being fastened; Fig. 2, an end view of the clamp locked in position; Fig. 3, a transverse section of the clamp in use, and Fig. 4 a plan view of the clamp detached from the hose and opened.

The clamp consists of two semi-cylindrical or concave halves, A, hinged together, and provided with locking devices, by which they can be fastened in place around the hose. There may be any desired number of the locking devices, each consisting of a lever, B, provided with a stirrup, C, to engage with a lug or hook, D, the lug being formed on one of the halves A, and the lever pivoted to the other, as shown.

In the present instance I have shown the clamp with two of the locking devices, one at each end; but the number and location will depend upon the size and length of the clamp. Each clamping-lever is so arranged that when raised and thrown forward its stirrup may be engaged over the lug or hook, while the edges of the two parts A are separated an inch or more, as shown in Fig. 2, and that as the lever is then depressed it causes the link to draw the clamp tightly together around the hose, as shown in Figs. 2 and 3. The end of the link swings inward past the center of the lever, as shown, so that the strain on the link serves to hold the lever down and prevent the device from unlocking.

On one side of the clamp I secure a rigid handle or bail, E, which serves as a means by which to readily carry the device, and also as a means by which to hold the same firmly with the foot when locking and unlocking the levers. While the clamp is resting on the ground and held by one foot it may be readily locked and unlocked by means of the other foot—a matter of great convenience when the hands of the fireman are benumbed with cold, or when the clamp lies in the mud or snow, as is so frequently the case.

In order the more effectually to prevent leakage when the clamp is in position around the broken portion of the hose, I provide the parts A with a rubber packing, G, which projects at the ends and along the edges of the parts, as shown, so that when the clamp is in position the packing forms a tight joint between the hose and the ends of the clamp, and also between the edges of the two parts A. The packing in each part A consists of a single sheet held in place by a metal plate, I, secured by a screw, K, as shown in Figs. 3 and 4.

In order to press the packing at the ends closely against the hose I provide the ends of the parts A with an internal bead or flange, $d$, which rests under and raises the edge of the packing, as shown in Fig. 4.

By providing the clamp with the peculiar fastenings shown, with the handle, answering the two purposes set forth, and with the packing arranged to encircle the hose, and also close the longitudinal joints or seams of the clamp, I produce a device which is very efficient, readily applied and detached, and at the same time very simple and cheap.

Having thus described my invention, what I claim is—

1. The hose-clamp consisting of the two concaves A, hinged together, and provided with the lever B, link C, and hook D, as shown and described.

2. In combination with the hinged concaves A, provided with the lever B, link C, and hook D, as shown, the rigid handle E, serving as a means by which to hold the clamp when being locked and unlocked, and also as a means by which to carry the same when not in use.

3. In combination with the concaves A, hinged together, the packing G, arranged as shown, to form a joint around the hose, and also between the edges of the concaves, as set forth.

GEORGE S. KNAPP.

Witnesses:
 P. T. DODGE,
 WILLIAM ROUNSEVILLE, Jr.